Aug. 4, 1964  L. P. DOSMANN  3,143,436
METHOD OF MAKING BREATHABLE FILMS AND COATED FABRICS
Filed Oct. 20, 1960
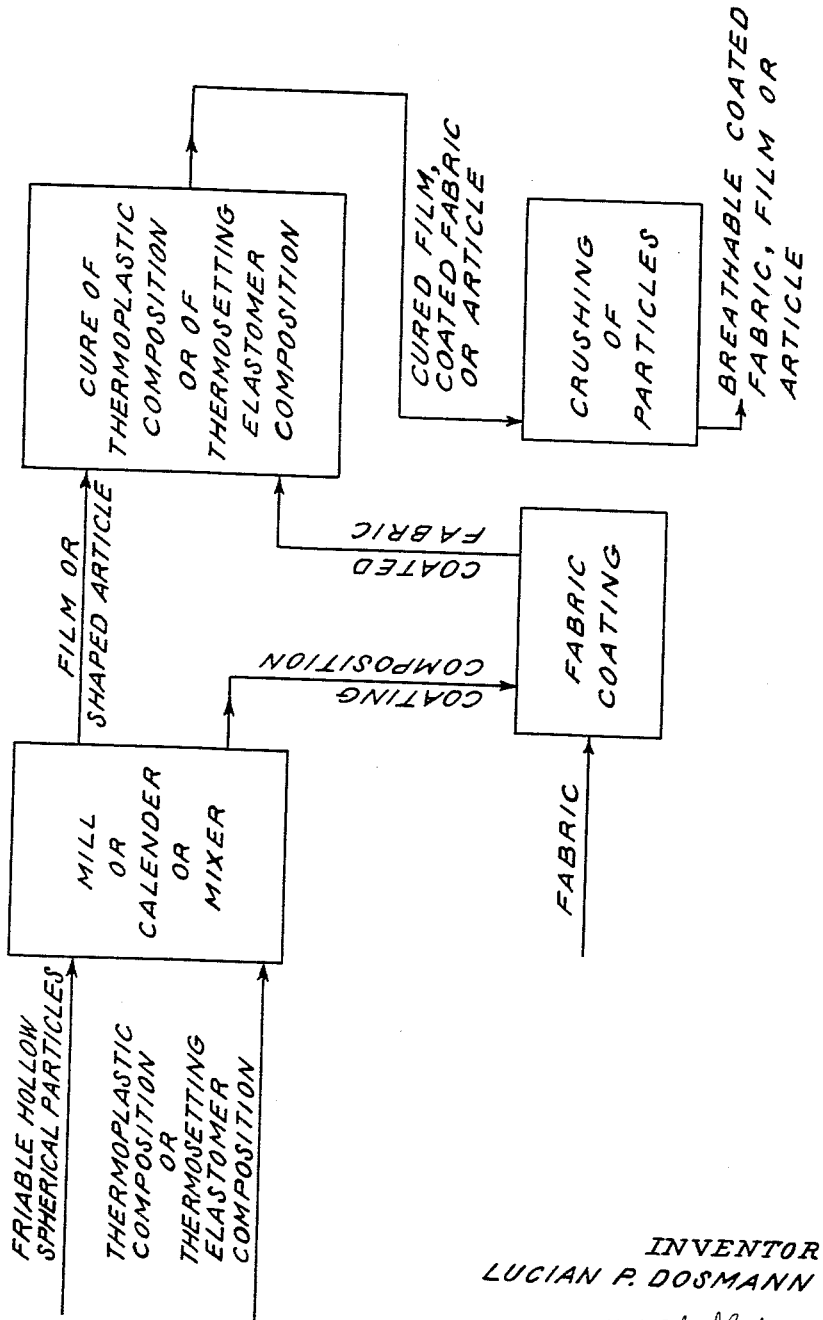
INVENTOR
LUCIAN P. DOSMANN
BY Kurt Shaffert
AGENT United States Patent Office 3,143,436
Patented Aug. 4, 1964

3,143,436
METHOD OF MAKING BREATHABLE FILMS
AND COATED FABRICS
Lucian P. Dosmann, South Bend, Ind., assignor to United
States Rubber Company, New York, N.Y., a corporation of New Jersey
Filed Oct. 20, 1960, Ser. No. 63,725
3 Claims. (Cl. 117—65.2)

This invention relates to an improved method of making breathable and vapor permeable articles, and to the articles made thereby. More particularly, it relates to the production of water resistant coated fabric which is breathable and vapor permeable, thus making it particularly adapted for the manufacture of rain wear.

In recent years breathability has become a very desirable characteristic to fabricators of rain and snow apparel and various other protective articles, such as protective coverings for laboratory workers and the like. Various techniques have been proposed to impart this characteristic to specific compositions, such as my U.S. Patent No. 2,698,816, issued January 4, 1955. Such methods suffer from the disadvantage of being limited to certain specific compositions.

I have discovered a method of making breathable coated fabrics, films and other articles by interspersing friable spherical hollow particles, commonly known as microballoons, in either free-flowing thermoplastics or free-flowing thermosetting elastomers, forming the interspersion into the desired shape and contour, and subsequently subjecting the formed article to crushing forces in order to break said friable particles, thereby producing pluralities of minute passageways throughout the article. Films, coated fabrics and other articles prepared by this technique are breathable and vapor permeable, yet water resistant.

The spherical hollow particles of my invention must be friable, i.e., said particles must crush or rupture easily with light positive pressures. Also, these particles must be chemically inert and insoluble at both ambient and elevated temperatures in relation to the compositions in which they are interspersed. The particles may be made from plastic or ceramic materials such as the materials disclosed in U.S. Patent 2,797,201 to Veatch et al., issued June 25, 1957. Of these materials the ureaformaldehyde resins, phenolic resins, and clay are preferred because of commercial availability. There is no limitation as to the particle size of the microballoons employed in my invention although it is apparent that there must be some relationship between the thickness of the product and the diameters of the friable hollow particles. In preparing films having a thickness of from 0.010 to 0.020 inch I have found that microballoons of from 0.0098 to 0.0165 inch in diameter are suitable. It is apparent that the diameters of the microballoons must be less than the thickness of the product. Furthermore, it is apparent that if the particles are too small in diameter, or if the film is too thick in relation to the microballoon diameter, excessive pressures are required to subsequently mechanically fracture them. In such cases, the spherical hollow particles will act as a filler instead of an additive to increase breathability. Obviously, this effect is undesirable.

The free-flowing thermoplastics and free-flowing thermosetting elastomers into which the microballons are interspersed include plasticized polyvinyl halides and copolymers thereof, dry slurries of polyethylene and other thermoplastic polymers, and viscous liquid systems, such as plastisols, natural and synthetic rubber latices, polyamide-epoxy resin compositions, and solvent softened elastomeric compositions. It will be realized that the microballoons can be incorporated in any such composition or material which is sufficiently soft to prevent fracturing of the microballoons during the compounding and mixing, and forming operations, viz. molding, spreading or calendering operations depending on the desired product.

There is no precise limitation on the quantity of the friable spherical hollow particles per quantity of composition or material into which they are interspersed. It is apparent that larger particles cannot be used in as high a proportion as the smaller particles. For most products, I have found that the smaller particle sizes can be used up to 50 parts by weight per 100 parts by weight of thermoplastic or elastomeric composition, while the larger particle sizes can be used in quantities as low as 10 parts by weight, i.e., a range of from 10 to 50 parts by weight of the microballoons per 100 parts by weight of the material or composition into which they are interspersed generally in suitable although this will vary with the product and the degree of breathability desired therein.

The interspersions of microballoons and thermoplastic or elastomeric compositions may contain any of the usual processing aids, such as curing agents, all of which is well known in the art. The interspersions may be cast or molded into the desired shape and contour at elevated temperatures in the case of thermoplastics and at ambient temperatures in the case of thermosetting elastomers. In the former, the cast or molded articles is cooled and then subjected to crushing forces, whereas in the latter, forces are directed to the cast or molded product either while still hot from the thermosetting or curing operation or after the set or cured product has been allowed to cool.

Also, I can prepare films from the interspersion by casting it in the form of a sheet, such casting being carried out at elevated temperatures if thermoplastic compositions are employed and at room temperatures if thermosetting elastomers are employed, cooling or heating depending on the nature of the composition, and either passing the film through squeeze rolls to crush the microballoons or passing it through embossing rolls for the same purpose, if the film is to be embossed. I can prepare coated fabrics by employing the same technique after initially spreading the thermoplastic or elastomeric compound on said fabric.

The flow sheet of the process is illustrated in the drawing.

The following examples are illustrative of my invention:

*Example 1*

The following materials were mixed together in a Hobart mixer:

|  | Pounds |
|---|---|
| "Vinyl VR30" (polyvinyl chloride of medium molecular weight marketed by Naugatuck Chemical Division of the United States Rubber Co.) | 210 |
| "Vinyl VR24" (polyvinyl chloride of low molecular weight having high plasticizer absorbing properties also marketed by Naugatuck Chemical Division of the United States Rubber Co.) | 130 |
| "QYTQ Vinyl" (plastisol grade polyvinyl chloride resin marketed by Bakelite Corp.) | 60 |
| Tricresyl phosphate | 126 |
| Admix 710 (Epoxidized soy bean oil plasticizer) | 14 |
| Plastolien 9058 (Emery Industries) | 80 |
| Whiting | 100 |
| Calcium stearate | 3 |
| Color pigments | 20 |

Based on the total weight of the above composition, 10% by weight of Kanamite (registered trademark of unicellular spherulized clay particles marketed by Ferro Corporation) was added to an open mill containing the homogeneous mixture after heating the composition to 330° F. prior to such additions. The temperature was maintained at 330° F. and the interspersion was fed into a four roll offset calender and a twill fabric (1.14 yards of 54″ twill weighing 1 pound) 1180 net fabric (i.e., 35 courses per inch, 29.8 wales per inch, and 4.76 oz. per sq. yard) was skim coated to 23 oz./square yard overall (approximately a 20 mil thickness) no appreciable fracturing of the microballoons occurred at this point. Calender temperatures were 310° F. at the offset roll, 310° F. at the top roll, 330° F. at the middle roll, and 220° F. at the bottom roll. A slip finish (which is optional, but usually done) was applied at the spreader to the coated fabric. Embossing trials (at which point the microballoons were fractured) using a link roll design were performed on the coated fabric. Breathability of the coated embossed fabric was measured by the time required to draw 450 cc. of air through a one inch disc of said fabric. The method of testing is described in my U.S. Patent 2,698,816 (lines 45–63 of column 5). A time of 47 seconds was noted for the link roll design coated net fabric.

*Example 2*

The following materials were mixed on a two-roll mill:

| | |
|---|---|
| "Neoprene" GN (neoprene rubber) | 100 |
| "Kenflex" L (synthetic polymer of aromatic hydrocarbon) | 8 |
| Process oil (naphthenic hydrocarbon oil) | 10 |
| "Neozone" D (phenyl beta-naphthalamine) | 2 |
| "Pellatex" (furnace carbon black) | 1 |
| Zinc oxide | 12 |
| Sun proof wax (combination of paraffin and casper wax) | 5 |
| Altax (benzothiazyl disulfide) | 0.5 |
| Toluol | 30 |

The above composition was milled at a temperature of 80° F., the toluol added last, until proper mix was achieved. Thereafter, based on the total weight of the above composition, 10% by weight of the microballoons, passed through a 20 mesh screen, were added to the open mill containing the homogeneous mixture. Thereafter, the compound was calender coated onto a 1180 net fabric in the amount of 15.75 ounces per square yard. The coated fabric was dried by conventional means to remove the toluene. This could conventionally be done by passing through a hot air oven. Thereafter, the material was given an atmospheric air cure of 30 minutes in a hot air oven at 280° F. The breathability on this sample, after crushing with a plain roll, was measured at 40 seconds.

*Example 3*

The following materials were mixed together on a mill at a temperature of approximately 150° F.:

| | |
|---|---|
| Polyisoprene | 100 |
| Stearic acid | 1 |
| Zinc oxide | 5 |
| Titanium dioxide | 10 |
| Clay | 50 |
| Talc | 50 |
| "Reogen" (80% mineral oil, 15% sulfonated petroleum product, 5% N butyl alcohol) | 5 |
| Paraffin oil | 15 |
| Lecithin | 2 |
| Triethylolamine | 2 |
| "Naugawhite" | 1 |
| Sulfur | 1 |
| "Altax" (benzothiazyl disulfide) | 1 |
| Ethyl Zimate (zinc diethyldithiocarbamate) | 0.25 |

Based on the total weight of the above composition, 10% by weight of the microballoons, passed through a 20 mesh screen, were added to the mill containing the homogeneous mixture. Thereafter, the material was calendered onto a carrier belt and pressure cured at 280° F. (40 p.s.i.) for 30 minutes. The weight of the film was 37.8 ounces per square yard. Thereafter the film was run through a set of crushing rolls to fracture the microballoons. The breathability of the film, after removal from the carrier belt, was measured as 57 seconds.

*Example 4*

The following materials were mixed together in conventional latex compounding equipment:

| | |
|---|---|
| Natural rubber latex | 100 |
| Zinc oxide | 1 |
| OXAF (zinc salt of mercaptobenzothiazole) | 0.5 |
| Ethyl Zimate (zinc diethyldithiocarbamate) | 0.15 |
| Sulfur | 1 |
| Antox (condensation product of butyraldehyde and aniline) | 5 |

Based on the total weight of the above composition, 5 parts by weight of the microballoons, passed through a 20 mesh screen, were added to the mixture. The mixture was thereafter cast onto a carrier belt as a film and cured, after drying, by heating in a hot air oven at 280° F. for 30 minutes. Thereafter it was run through a set of crushing rolls. The film weighed 13.5 ounces per square yard, and had a measured breathability of 32 seconds.

Having thus described my invention, what I claim and desire to protect by Letters Patent is:

1. A method of making a breathable coated fabric comprising interspersing from 10 to 50 parts by weight of friable hollow spherical particles in 100 parts by weight of a composition selected from the group consisting of thermoplastics and thermosetting elastomers, said composition being sufficiently soft to prevent these particles from fracturing during the compounding and mixing thereof and said particles all having diameters less than the thickness of the coating to be formed on said fabric and being chemically inert with respect to such compositions and insoluble therein, coating a fabric with said interspersion, allowing said interspersion to set, and subsequently rupturing the spherical hollow particles by subjecting the coated fabric to crushing forces, thereby producing pluralities of minute passageways throughout the coating.

2. A method for making breathable film comprising interspersing from 10 to 50 parts by weight of friable hollow spherical particles in 100 parts by weight of a composition selected from the group consisting of thermoplastics and thermosetting elastomers, said composition being sufficiently soft to prevent these particles from fracturing during the compounding and mixing thereof and said particles all having diameters less than the thickness of the film to be formed and being chemically inert with respect to such compositions and insoluble therein, casting the interspersion into a film, allowing said interspersion to set, and subsequently subjecting the film to crushing forces, thereby producing pluralities of minute passageways throughout the film.

3. A method for making breathable articles comprising interspersing from 10 to 50 parts by weight of friable hollow spherical particles in 100 parts by weight of a composition selected from the group consisting of thermoplastics and thermosetting elastomers, said composition being sufficiently soft to prevent these particles from fracturing during the compounding and mixing thereof and said particles all having diameters less than the smallest dimension of the article to be molded and being chemically inert with respect to such compositions and insoluble therein, molding the interspersion into the desired shape and contour while allowing the interspersion to set, and subsequently rupturing the hollow spherical particles by subjecting the molded article to crushing forces, thereby producing pluralities of minute passageways throughout the molded article.

References Cited in the file of this patent

UNITED STATES PATENTS

| | | |
|---|---|---|
| 2,766,485 | Jevelot et al. | Oct. 16, 1956 |
| 2,777,824 | Leeds | Jan. 15, 1957 |
| 2,806,509 | Bozzacco et al. | Sept. 17, 1957 |
| 2,945,776 | Conguisti et al. | July 19, 1960 |
| 2,986,455 | Sandmeyer | May 30, 1961 |
| 3,016,308 | Macaulay | Jan. 9, 1962 |

FOREIGN PATENTS

| | | |
|---|---|---|
| 832,707 | Great Britain | Apr. 13, 1960 |